(12) United States Patent
Klika et al.

(10) Patent No.: US 6,382,166 B1
(45) Date of Patent: May 7, 2002

(54) BALANCING SYSTEM USING RECIPROCATING COUNTERBALANCE WEIGHT

(75) Inventors: Daniel L. Klika, Waukesha; John H. Thiermann, Greenfield, both of WI (US)

(73) Assignee: Briggs & Stratton Corporation, Milwaukee, WI (US)

( * ) Notice: Subject to any disclaimer, the term of this patent is extended or adjusted under 35 U.S.C. 154(b) by 0 days.

(21) Appl. No.: 09/772,835

(22) Filed: Jan. 30, 2001

(51) Int. Cl.[7] ................................................ F02B 75/06
(52) U.S. Cl. ..................................... 123/192.2; 74/603
(58) Field of Search .......................... 123/192.2; 74/603

(56) References Cited

U.S. PATENT DOCUMENTS

| | | |
|---|---|---|
| 350,068 A | 9/1886 | Louque |
| 1,738,876 A | 12/1929 | Edwards et al. |
| 1,871,899 A | 8/1932 | Marshall |
| 3,457,804 A | 7/1969 | Harkness |
| 4,407,169 A | 10/1983 | Menen |
| 4,440,123 A | 4/1984 | Tsai |
| 4,509,474 A | 4/1985 | Schmuck |
| 4,628,876 A | 12/1986 | Fujikawa et al. |
| 4,656,981 A | 4/1987 | Murata et al. |
| 4,688,528 A | 8/1987 | Nivi et al. |
| 4,781,156 A | 11/1988 | Berger et al. |
| 4,800,852 A | 1/1989 | Kandler |
| 4,819,593 A | 4/1989 | Bruener et al. |
| 5,335,532 A * | 8/1994 | Mueller et al. ............... 72/450 |
| 5,588,407 A | 12/1996 | von Essen et al. |
| 5,927,242 A | 7/1999 | Kollock |

* cited by examiner

*Primary Examiner*—Tony M. Argenbright
*Assistant Examiner*—Katrina B. Harris
(74) *Attorney, Agent, or Firm*—Michael Best & Friedrich LLP

(57) ABSTRACT

An engine counterbalancing system has a counterbalance weight that reciprocates in a linear manner in opposition to piston movement. The counterbalance weight is preferably coupled to the crankshaft via two spaced link arms that engage two respective eccentrics of the crankshaft. The counterbalance weight is guided by one or more rails that are formed integrally on the inner surface of the crankcase housing.

13 Claims, 5 Drawing Sheets

BALANCING SYSTEM USING RECIPROCATING COUNTERBALANCE WEIGHT

FIELD OF THE INVENTION

The present invention relates generally to internal combustion engines, and more particularly to a reciprocating counterbalance weight for balancing such an engine.

BACKGROUND OF THE INVENTION

This invention relates to a counterbalance weight system for reducing the vibrational forces in an engine resulting from piston reciprocation.

A major cause of vibration in an engine is piston reciprocation. The piston is started and stopped twice during each rotation of the crankshaft, and reactions to the forces which accelerate and decelerate the piston are imposed upon the engine body as vibration in directions generally parallel to the piston axis. In installations such as lawn and garden implements, the engine produces a vibration that is transmitted through the machine to the operator. This vibration is uncomfortable and could produce operator fatigue. Even in an installation where there is no element of operator fatigue, such as sump pumps or portable generators, engine vibration is undesirable because it causes maintenance problems and tends to reduce the useful life of the machine.

To some extent such vibrations can be decreased by providing the engine with a counterweight fixed on its crankshaft, and located at the side of the crankshaft axis directly opposite the crankpin by which the piston, through the connecting rod, is connected to the crankshaft. More commonly, two counterweights may be used on the crankshaft, one located on each side of the piston axis. In either case, such a crankshaft counterweight arrangement produces a net resultant force vector that is diametrically opposite to the crankpin.

It is also known to use an additional counterbalance weight to further balance the forces due to piston reciprocation. Various arrangements are known for such counterbalance weights, including the use of pivoting and reciprocating counterbalance weights.

SUMMARY OF THE INVENTION

An engine balancing system is disclosed in which the counterbalance weight moves in a linear manner in opposition to the reciprocating piston.

In a preferred embodiment, the balancing system includes a counterbalance weight that is disposed on a second side of the crankshaft that is generally opposite to the first side on which the piston is disposed. The counterbalance weight reciprocates in response to rotation of the crankshaft. The invention further comprises an eccentric formed on the crankshaft, and at least one link arm that couples the counterbalance weight to the crankshaft. In the preferred embodiment, two spaced link arms are used.

The invention also includes at least one rail interconnected with the crankcase housing such that the counterbalance weight is slidable along the rail. One or two additional rails may be provided. Recesses or slots may be provided in the counterbalance weight that receive one or more rails. In an alternating embodiment, one or more rails may be provided, in addition to guides which keep the counterbalance weight in proper alignment, but are not themselves received within the counterbalance weight slots.

An advantage of the present invention is that the counterbalance weight moves in a linear manner in opposition to the linear motion of the reciprocating piston, for improved balancing.

Other features and advantages of the present invention would be apparent to those skilled in the art from the detailed description of the invention and the drawings, in which:

Figure 1:
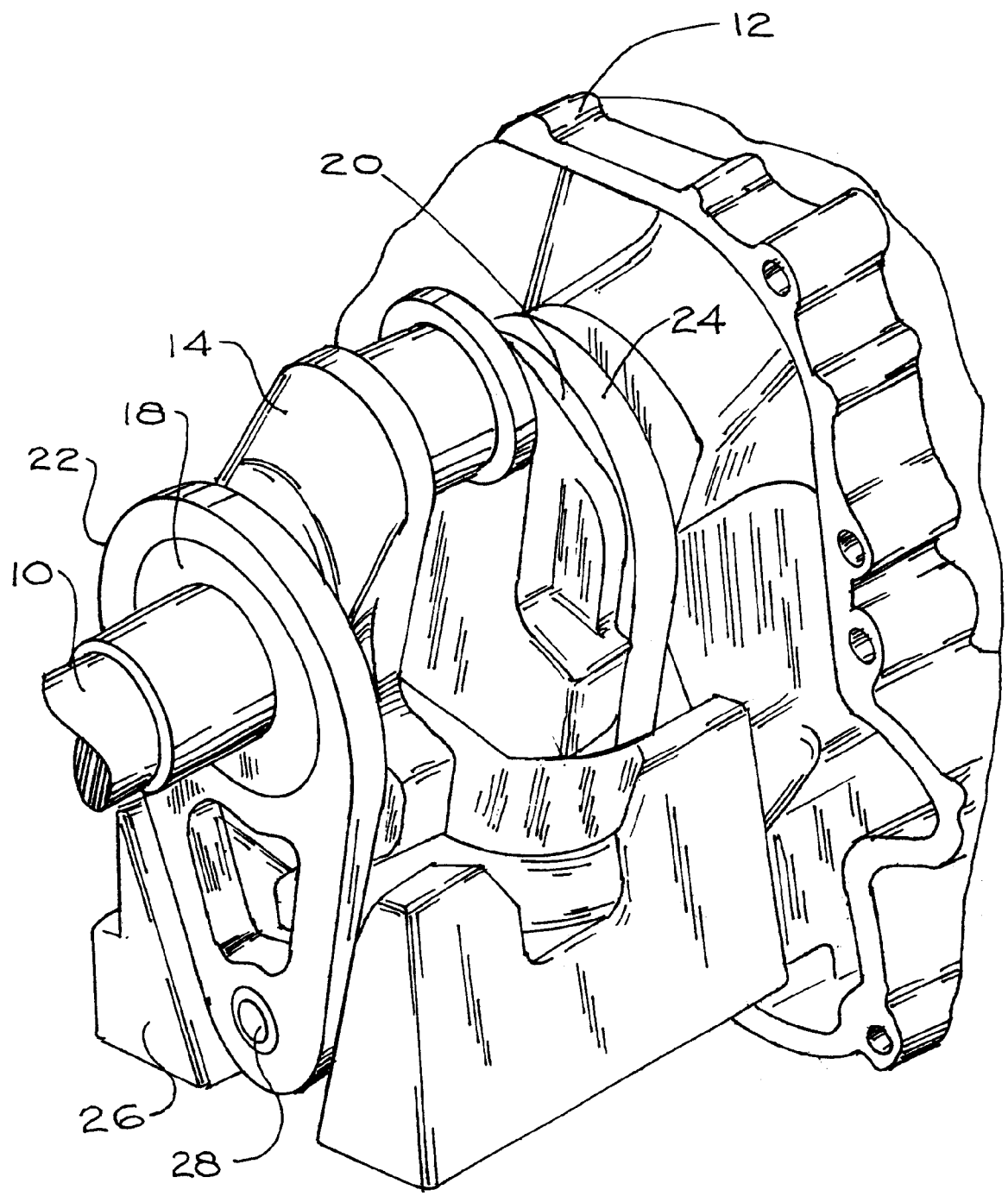
FIG. 1 is a perspective view of a balancing system according to the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAIL DESCRIPTION OF THE INVENTION

FIG. 1 is a perspective view of the invention incorporated into an engine.

Figure 5:
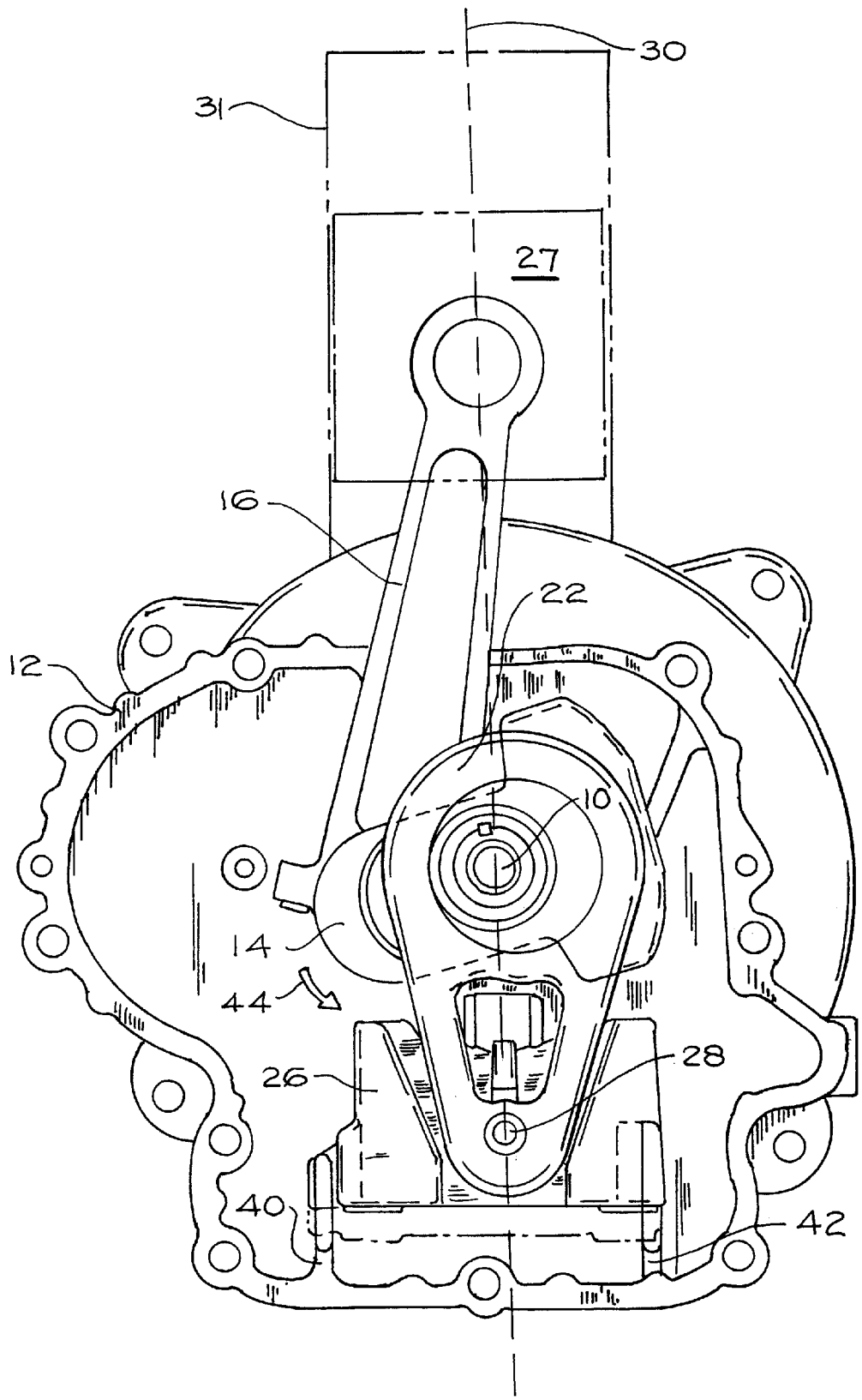
FIG. 5 is an end view of an engine when the piston is approaching the bottom dead center position.

In FIG. 1, a crankshaft 10 is journaled in a crankcase housing 12. The crankshaft has a throw 14 through which the crankshaft 10 engages a connecting rod 16 (FIG. 5). The crankshaft also has two eccentrics 18 and 20 disposed on opposite sides of throw 14. Respective link arms 22 and 24 are coupled between the respective eccentrics and a counterbalance weight 26. Link arms 22 and 24 are preferably made from an aluminum alloy, which keeps the side to side forces lower than if the link arms are made from iron. Counterbalance weight 26 has two opposed pins 28 to which the link arms 22 and 24 are connected.

Figure 2:
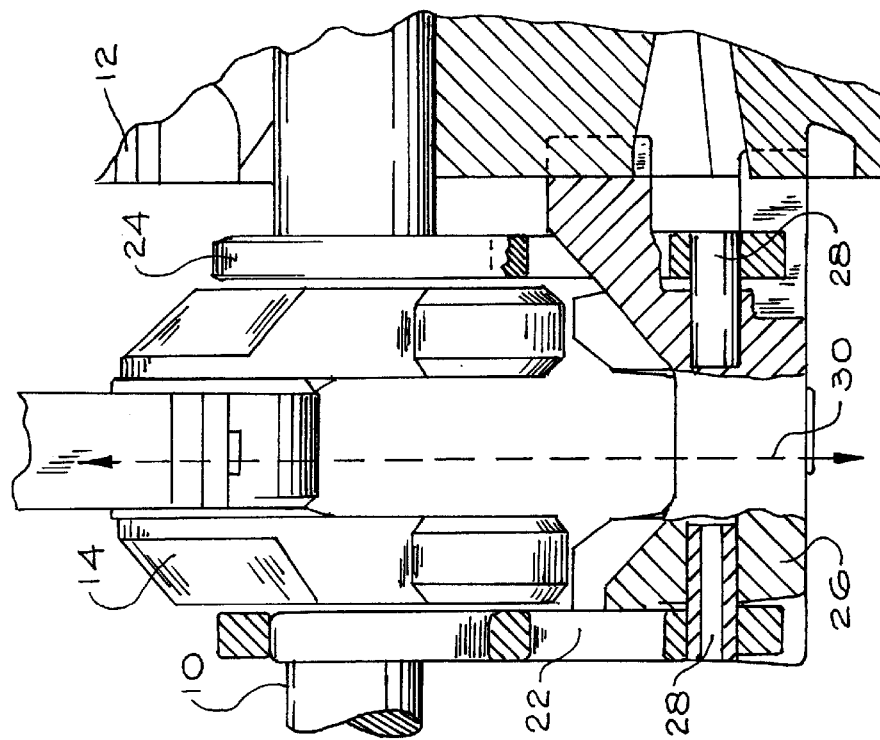
FIG. 2 is a partial side view of the balancing system of FIG. 1.

Counterbalance weight 26 may have any configuration, as long its mass is substantially evenly distributed on opposite sides of a cylinder axis 30 of cylinder 31 (FIG. 2).

Figure 3:
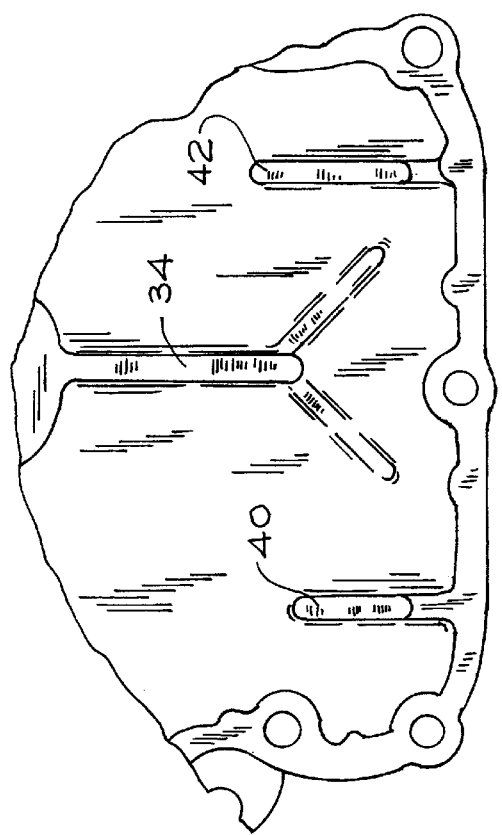
FIG. 3 is the top view of an engine crankcase housing depicting the rails and guides used in the present invention.
Figure 4:
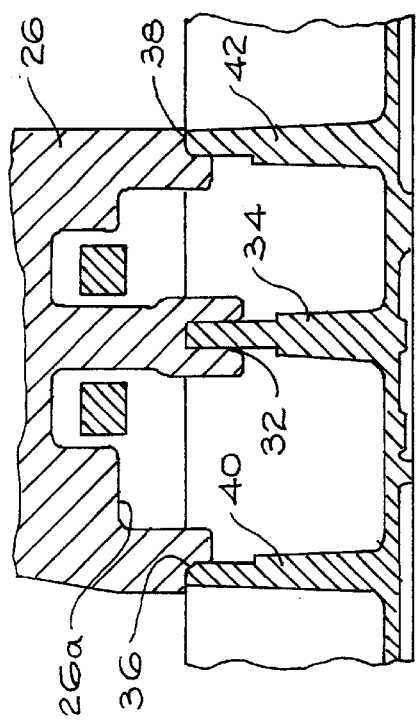
FIG. 4 is a cross sectional side view, taken along line 4—4 of FIG. 6, depicting the rails engaging the slots on the counterbalance weight.

As best shown in FIGS. 3 and 4, counterbalance weight 26 has a centrally disposed slot 32 in its crankcase facing surface 26a that receives a rail 34 interconnected with crankcase housing 12. Counterbalance weight 26 also has two slots or recesses 36 and 38 in which ride two respective rails 40 and 42. Rails 40 and 42 are also interconnected or formed integral with crankcase housing 12.

In alternate embodiments, recesses 36 and 38 may be eliminated and replaced by flat surfaces which merely guide counterbalance weight during its reciprocation. In another alternative, recesses 36 and 38 may be replaced by slots similar to slot 32, with slot 32 and rail 34 being eliminated.

In short, only a single rail is required with a corresponding slot or recess to guide the weight 26, although it may be desirable to include one or more flat guide surfaces on both weight 26 and on the crankcase housing if only a single rail is used.

Of course, the rail could alternately be formed on weight 26 and the slot or recess formed integral or otherwise interconnected with the crankcase housing.

The position of the rails keeps them at least partially immersed in the crankcase oil, thereby keeping the rails and the corresponding slots well lubricated.

Figure 6:
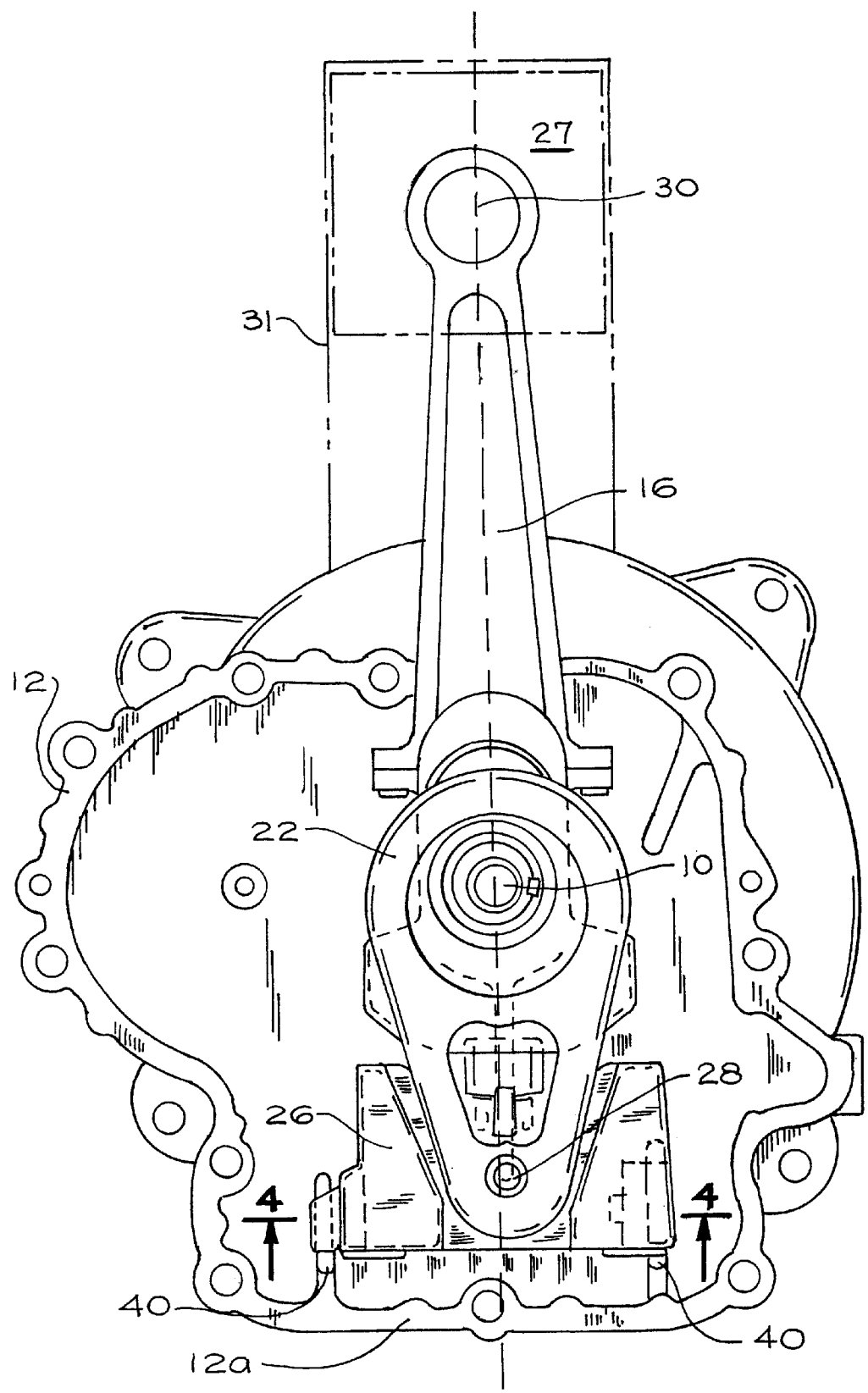
FIG. 6 is an end view of the engine when the piston is at its top dead center position.

As best shown in FIGS. 5 and 6, counterbalance weight 26 moves in a linear manner in opposition to the movement of piston reciprocation, thereby balancing the forces of the reciprocating piston.

FIG. 5 depicts the position of counterbalance weight 26 when the piston 27 is nearing its bottom dead center (BDC) position. In FIG. 5, as the piston moves downward towards BDC, the crankshaft is rotating in the direction indicated by arrow 44. At the same time, counterbalance weight 26 is reciprocating, moving in a linear direction toward crankshaft 10, along rails 34, 40 and 42.

FIG. 6 depicts the piston 27 in its top dead center position. In this position, counterbalance weight 26 is at the position that is furthest away from crankshaft 10 and closest to the inner wall 12a of crankcase housing 12.

Figure 8:
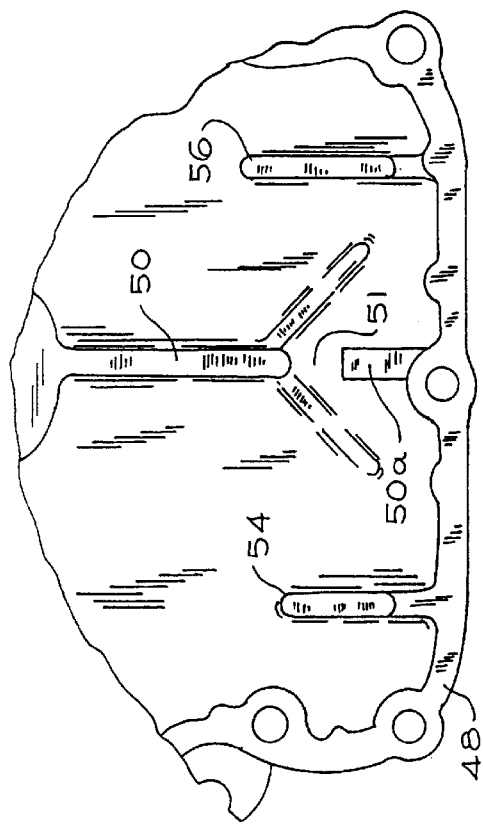
FIG. 8 is the top view of an engine crankcase housing depicting the rails and guides used in the alternate embodiment.
Figure 9:
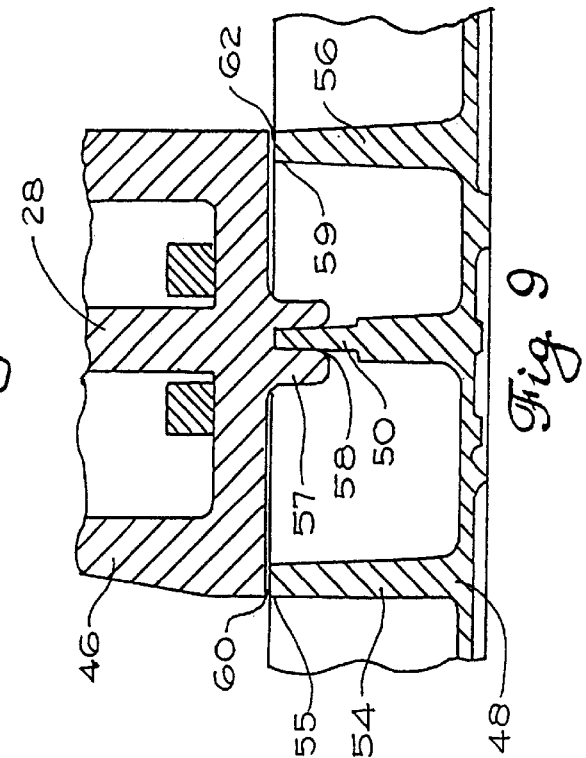
FIG. 9 is a cross sectional side view depicting the rails engaging the slots on the counterbalance weight of the alternate embodiment.
Figure 7:
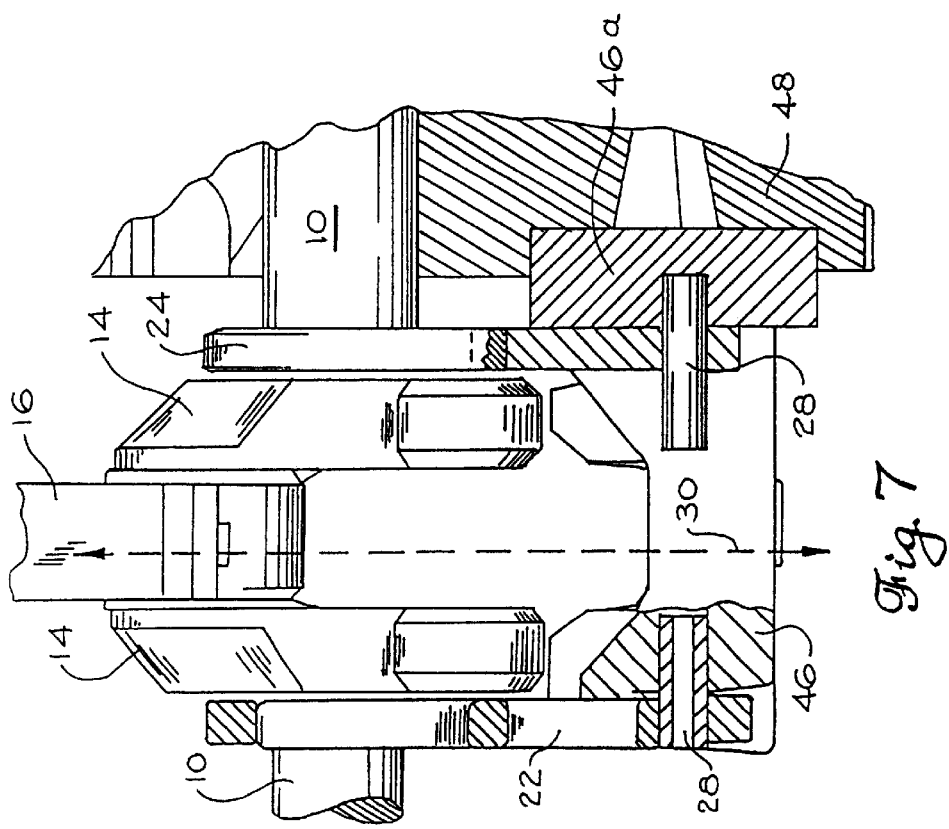
FIG. 7 is a partial side view of an alternate embodiment of a balancing system.

FIGS. 7 through 9 relate to a second embodiment of the invention having a single rail. In all the figures, like components have been given the same numerical designations.

In FIG. 7, counterbalance weight 46 is guided by two link arms 22 and 24, as in the first embodiment. However, link arm 24 is now positioned radially inward of counterbalance weight portion 46a, to allow a longer, single rail to be used. By comparison, the embodiment shown in FIG. 2 has the link arm 24 positioned closer to the crankcase than in the second embodiment.

In FIGS. 7–9, counterbalance weight 46 has an extension 57 in which a slot 58 is formed. An elongated, centrally-disposed rail 50 formed integral with crankcase 48 rides within slot 58. The central rail 50 is divided into two sections 50 and 50a with a gap 51 therebetween. This gap enables lubricant to freely flow from one side of the rail to the other.

As also shown in FIGS. 8 and 9, crankcase housing 48 has two spaced, integrally-formed guides 54 and 56 disposed on opposite sides of rail 50, 50a. Guides 54 and 56 have flat upper surfaces 55, 59 respectively which engage respective flat contact surfaces 60 and 62 of counterbalance weight 46.

The entire balancing system may be assembled without the need for additional apertures being formed in the crankcase housing, thereby eliminating machining steps, keeping the part count low, and eliminating the gasket which would otherwise be used to seal an additional aperture. As a result, the cost and the likelihood of leaks is minimized.

The balancing system may be used on a wide variety of engines, including but not limited to single cylinder, vertical shaft overhead valve engines of the type used in lawn and garden applications.

We claim:

1. A balancing system for an internal combustion engine having a crankcase housing and a cylinder bore defining a cylinder axis, the system comprising:

a crankshaft substantially within the crankcase housing, wherein the cylinder bore is disposed on a first side of the crankshaft;

a piston disposed in the cylinder bore for reciprocal movement generally along the cylinder axis in response to rotation of the crankshaft;

a counterbalance weight disposed on a second side of the crankshaft that is generally opposite the first side, said counterbalance weight reciprocating in response to rotation of the crankshaft; and a rail interconnected with at least one of said counterbalance weight and said crankcase housing such that said rail guides said counterbalance weight during reciprocation of said counterbalance weight.

2. The system of claim 1, further comprising a link arm coupling the counterbalance weight to the crankshaft.

3. The system of claim 2, further comprising a throw portion of the crankshaft, wherein the link arm engages the throw portion.

4. The system of claim 2, further comprising an eccentric portion of the crankshaft, wherein the link arm engages the eccentric portion.

5. The system of claim 2, wherein the link arm is formed from an aluminum alloy.

6. The system of claim 1, further comprising two spaced link arms coupling the counterbalance weight to the crankshaft.

7. The system of claim 1, further comprising a second rail interconnected with at least one of the counterbalance weight and the crankcase housing that guides said counterbalance weight.

8. The system of claim 7, further comprising a third rail interconnected with at least one of the counterbalance weight and the crankcase housing that guides said counterbalance weight.

9. The system of claim 1, wherein the rail is substantially parallel to the cylinder axis.

10. The system of claim 1, wherein the other of said counterbalance weight and said crankcase housing has a slot that receives said rail.

11. The system of claim 1, further comprising:

a guide surface that engages said counterbalance weight.

12. The system of claim 1, wherein said counterbalance weight moves linearly in opposition to piston reciprocation.

13. The system of claim 1, wherein the mass of said counterbalance weight is equally distributed on opposite sides of said cylinder axis.

* * * * *